United States Patent

[11] 3,609,691

| [72] | Inventor | Victor E. Stewart, Jr.<br>South Milwaukee, Wis. |
|---|---|---|
| [21] | Appl. No. | 711,705 |
| [22] | Filed | Mar. 8, 1968 |
| [45] | Patented | Sept. 28, 1971 |
| [73] | Assignee | McGraw-Edison Company<br>Milwaukee, Wis. |

[54] MEANS FOR ACTIVATING AND CONTROLLING A REMOTE METER READING SYSTEM
12 Claims, 7 Drawing Figs.

[52] U.S. Cl. .................................................... 340/151, 340/150
[51] Int. Cl. ....................................................... H04g 9/10
[50] Field of Search ........................................... 340/151, 150

[56] References Cited
UNITED STATES PATENTS

| 3,072,894 | 1/1963 | Chapin | 340/151 X |
| 3,266,018 | 8/1966 | Higgins | 340/151 |
| 3,478,342 | 11/1969 | Alldritt et al. | 340/151 X |
| 3,376,389 | 4/1968 | Fair | 340/151 X |

*Primary Examiner*—John W. Caldwell
*Assistant Examiner*—Michael Slobasky
*Attorney*—R. J. Falkowski

ABSTRACT: A system for the automatic remote reading of utility meters including a position encoder and transponder having a plurality of position coding means coupled to the meter being read and oscillator means for generating tones in accordance with the positions of the respective position coding means. A centrally located remote transponder exciter provides a voltage signal for energizing the transponder and for controlling circuit means in said transponder to thereby control the order of operation of the position coding means and oscillator means.

INVENTOR.
Victor E. Stewart, Jr.
BY Thomas E. Toyhy
Attorney

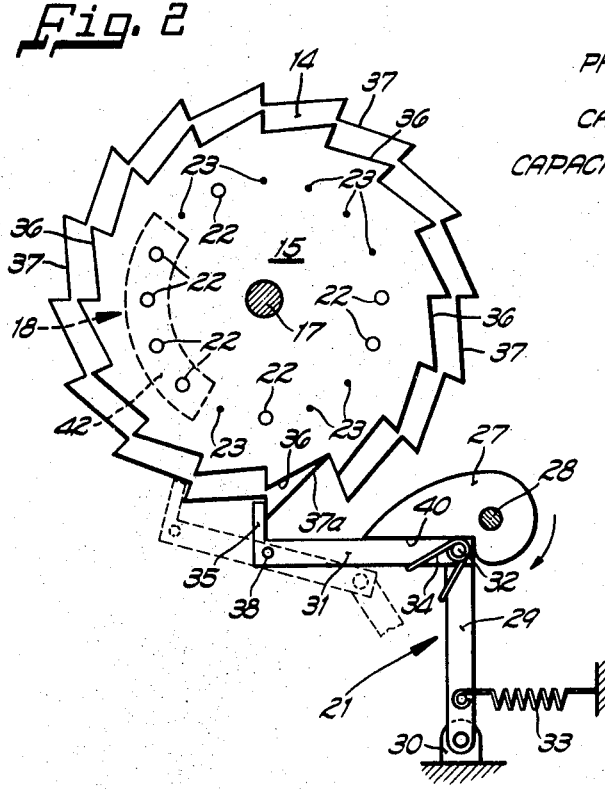
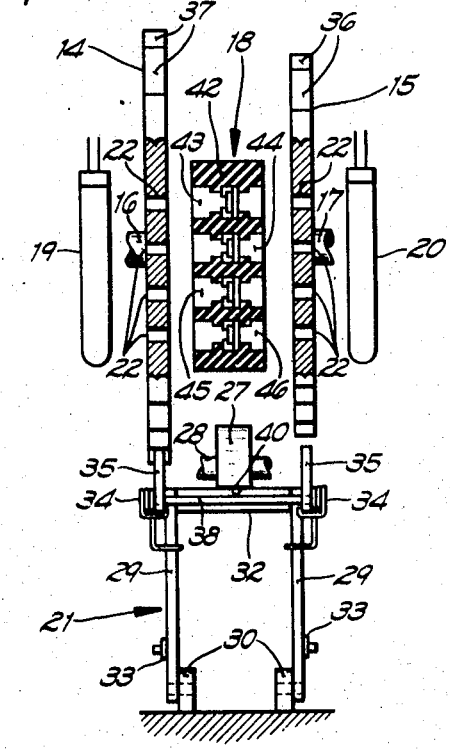
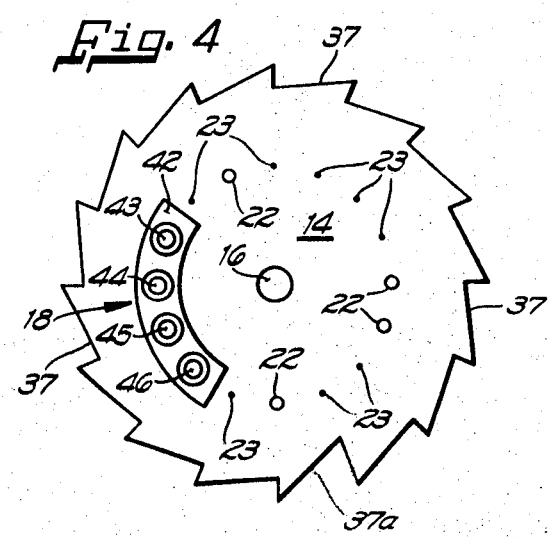
INVENTOR.
Victor E. Stewart, Jr.
BY Thomas E Torphy
Attorney INVENTOR.
Victor E. Stewart, Jr.
BY Thomas E. Torphy
Attorney INVENTOR.
Victor E. Stewart, Jr.
BY Thomas E Tophy
Attorney

MEANS FOR ACTIVATING AND CONTROLLING A REMOTE METER READING SYSTEM

BACKGROUND OF THE INVENTION

This invention relates to a position encoder and information transmitter or transponder and, more particularly, to a system for converting a quantity representing the position of a shaft or other movable member into a digital quantity for transmission to a central location together with centrally located means for activating and controlling the remotely located transponder. The invention has particular, but not exclusive, application to systems for the automatic remote reading of utility meters from a central location and numerically controlled machinery.

Utility meters, such as electric, gas and water meters, are generally widely distributed at the customers' points of usage. It is the present practice in the reading of such meters for a meter reader to visit each customer's site and to observe and record the registration on each unit. While there has been a large number of proposals for the automatic reading of such meters from a remote location, they have not been commercially adopted because of their high cost and because they could not meet the limitations imposed by existing utility meters and communication systems. Such limitations include expense and the relatively confined space available for encoding devices in utility metering equipment presently installed. Many of the proposed automated remote meter reading systems include remotely located transmitters with individual remotely located power supplies. The cost of such individual power supplies is one of the factors which contributes to the relatively high cost of previously devised meter reading systems.

It is an object of the invention to provide an economical encoding and signal transmitting system in which a plurality of encoding and transponding devices may be energized and controlled from a centrally controlled transponder exciter means.

It is another object of the invention to provide a system of the aforedescribed type in which the encoding device includes means for reading the positions of a plurality of register elements and in which the transponder exciter means includes means for selectively and sequentially activating the encoder and transponder means for the respective register elements.

It is a more specific object of the invention to provide a meter reading system of the aforedescribed type which is operable over presently installed telephone lines and in which the transponder exciter means does not cause undesirable and annoying ringing of the customer's telephone.

These and other objects and advantages of the present invention will be apparent from the description of the preferred embodiment.

SUMMARY OF THE INVENTION

A system including a remotely located position encoder with an associated transponder, and a centrally located transponder exciter means which is effective to energize and control the transponder. The position encoder is operable to read the positions of a plurality of information register elements. The transponder includes information transmitting means for individually transmitting information from each of the register elements. The transponder further includes circuit means for selectively controlling which register element is to be read. The transponder exciter means comprises means for supplying power to the transponder in a signal format which is effective to energize the transponder and control the circuit means. The signal format further can be applied to a conventional telephone system without causing unnecessary ringing of the connected telephones.

BRIEF DESCRIPTION OF THE DRAWINGS

FIGS. 2, 3 and 4 illustrate a coded disc and information bit configuration usable with the instant invention;

FIG. 5 is a table illustrating an example of the code and tone transmitted by the encoder and transponder illustrated in FIGS. 1 to 4;

DESCRIPTION OF THE PREFERRED EMBODIMENT

Figure 1:
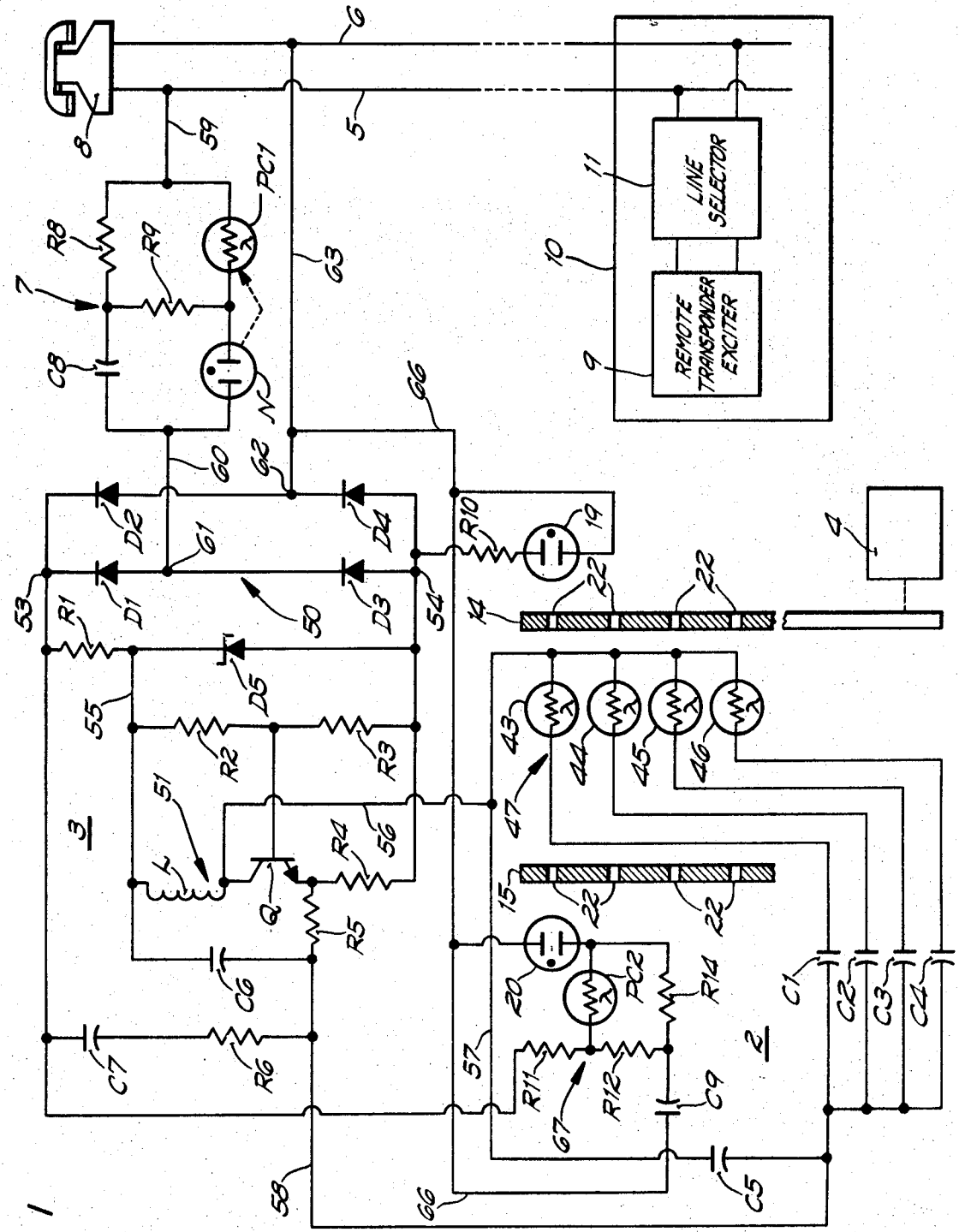
FIG. 1 shows a remote meter reading system incorporating the encoder, signal transponder and transponder exciter means according to the instant invention.

FIG. 1 shows an automatic remote meter reading system in which an encoder 2 and a transmitter or transponder 3 are employed. The encoder 2 is mechanically coupled to a meter 4 which is to be read and to the customer's telephone lines 5 and 6 through the transmitter 3 and a line coupler 7. It can be seen that the system is connected across lines 5 and 6 in shunt of the customer's telephone 8.

A remote transponder exciter 9 at a telephone exchange 10 is coupled to lines 5 and 6 through a line selector 11.

The details of the meter 4 and the line selector 11 form no part of the instant invention and, accordingly, will not be discussed in detail. The detailed construction and operation of the remote transponder exciter 9 will appear later in this description. For the present it is sufficient for a general understanding of the overall system to note that, when it is desired to read meter 4, the line selector 11 at the telephone exchange 10 is operated to connect the remote transponder exciter 9 to the desired telephone lines 5 and 6. The remote transponder exciter 9 then sends a signal through lines 5 and 6 to actuate the line coupler circuit 7, whereby the encoder 2 and the transponder 3 are actuated and coupled to the lines 5 and 6. The encoder 2 provides the coded information relative to the registration of meter 4 to the transponder 3 which, in turn, transmits the information through lines 5 and 6 to the telephone exchange 10 where the coded signal may be utilized by a suitable receiving means (not shown). The transponder 3 may take the form of an oscillator, and the encoder may change the parameters of the oscillating circuit as a function of the meter registration, whereby different tone signals will be placed on the lines 5 and 6 in accordance with the reading of meter 4.

FIGS. 2 and 3 show the preferred embodiment of the encoding device 2 in greater detail to include a pair of coded discs 14 and 15 which are respectively mounted for rotation about central shafts 16 and 17, a sensor assembly 18, a pair of neon lamps 19 and 20 and a drive assembly 21 for coupling discs 14 and 15 to the meter being read.

The discs 14 and 15 are provided with an array of coding units, one coding unit being provided for each disc position. In the illustrated embodiment, wherein each of the discs 14 and 15 has 16 positions, 16 coding units are provided on each disc. Also, where the sensor assembly 18 is photosensitive, the coding units comprise holes or transparent positions 22 and unperforated opaque positions 23.

As seen in FIG. 2, the coding units 22 and 23 are arranged on the disc 15 in a substantially equally spaced circular array. A similar array of units 22 and 23 are arranged on disc 14. As will be pointed out more fully hereinafter, the arrangement of holes 22 and opaque positions 23 is such that, when used with at least a four-unit sensor assembly 18, an unambiguous code will be provided for each of the 16 positions of the discs 14 and 15.

In addition, the outer periphery of each of the discs 14 and 15 is coupled to drive assembly 21 which is operative to successively step the disc 14 through each of its 16 positions and then to advance the disc 15 one position for each revolution of the disc 14. One example of a drive mechanism capable of performing these functions is described in U.S. Pat. No. 3,491,244, Jan. 20, 1970, by Victor E. Stewart, Jr. and assigned to the assignee of the present invention.

The drive assembly 21 includes a scroll cam member 27 which is fixed to a shaft 28 coupled to meter 4. The cam 27 cooperatively engages a pawl assembly for stepping the discs 14 and 15 and which comprises a first pair of parallel links 29 having one end pinned at a fixed pivot point 30 and a second pair of links 31 pivotally coupled to the other end of links 29 by a knee pin 32. A spring 33 holds pin 32 in a resilient engagement with the cam 27, and springs 34 urge clockwise rotation of links 31 to urge fingers 35 at free ends of links 31 into engagement with the teeth 36 and 37 formed respectively on discs 15 and 14.

The diameter of disc 14 is sufficiently greater than that of disc 15 so that the radially outward extremity of teeth 36 does not extend to the innermost indentation of teeth 37. As a result, one of the fingers 35 will engage the teeth 37 on disc 14, but the other finger 35 will normally be held out of engagement with the teeth 36 of disc 15 by a pin 38 which couples the ends of links 31, However, one tooth 37a of the teeth on disc 14 is deeper than the remaining teeth 37 so that teeth 36 on disc 15 will extend past its inner extremity.

As those skilled in the art will appreciate, the cam member 27 may be coupled to the meter by a gear drive (not shown) in such a manner that the cam member 27 will make one revolution for each of a predetermined number of revolutions of the meter 4. As the cam member 27 rotates clockwise, as seen in FIG. 2, the links 31 and 29 are moved from their full to their phantom positions wherein one of the fingers 35 will move into engagement with the succeeding one of teeth 37 on disc 14. As the cam member 27 completes one revolution, wherein its flat portion 40 is moved into engagement with pin 32, the spring 33 will return links 29 and 31 to their full positions, thereby moving the disc 14 one position in the counter-clockwise direction. The disc 15 will remain stationary, however, because the other finger 35 will be held out of engagement with teeth 36 by the larger outer periphery of the disc 14 and pin 38.

After disc 14 has completed one revolution wherein the tooth 37a is in a position to be engaged by the associated one of fingers 35, the greater depth of tooth 37a will allow engagement between the other finger 35 and one of the teeth 36 on the rim of disc 15. In this manner, the disc 15 will be moved one position for each complete revolution of disc 14.

As seen in FIGS. 2 and 3, the sensor assembly 18 comprises an opaque head 42 which is disposed between the discs 14 and 15 and in close parallelism thereto. When 16-position discs are provided, the sensor assembly 18 includes at least four sensor units or information bit means 43, 44, 45 and 46, which are spaced along the arcuate head 42 at the same distance as that between the coding units 22 and 23. The details of the sensor units 43 to 46 form no part of the present invention and, accordingly, will not be discussed in detail. It is sufficient for the purposes of understanding the instant invention to note that each may comprise a photoresistive element which normally has a relatively high impedance and which changes to a low impedance state upon being illuminated. For a more complete description of sensor units 43 to 46 which may be employed in the instant invention, reference is again made to U.S. Pat. No. 3,491,244.

Sensor units 43 through 46 are arranged so that for each position of the discs 14 and 15 one of the sensor units will face one of the coding units 22 or 23 in each of the discs 14 and 15. Lamps 19 and 20 are disposed adjacent the outer surfaces of each of the discs 14 and 15, respectively, and in an opposed relation to the sensor assembly 18. As will be pointed out more fully hereinafter, the lamps 19 and 20 are connected to be sequentially energized so that the sensor units 43 through 46 will be selectively energized through the holes 22 in the disc 14 by light emitted from the lamp 19 and then from the opposite side through holes 22 in disc 15 by light emitted from lamp 20. The position code for the disc 14 will be determined by which ones of the sensor units 43 through 46 are energized when lamp 19 is lit and, similarly, the position code for the disc 15 will be determined by which ones of these sensor units 43 through 46 are illuminated when lamp 20 is lit. It will be understood that only those sensor units 43 through 46 which are opposite a hole 22 in the appropriate one of the discs 14 or 15 will be illuminated, while those adjacent an opaque position 23 will remain unenergized.

If the position of the discs 14 and 15, as shown in FIGS. 2 and 3, is taken as the first position, each of the photosensitive units 43 through 46 will be illuminated when the lamps 19 and 20 are lit. As the discs 14 and 15 are stepped through each of their 16 positions, a different arrangement of photosensitive units 43 through 46 will be illuminated to provide the 16-position unambiguous code shown in FIG. 5.

Reference is again made to FIG. 1 which illustrates how the sensor units 43 through 46 are coupled to the transponder 3. Specifically, the sensor units 43, 44, 45 and 46 are respectively connected in series with capacitors C1, C2, C3 and C4, and the series combinations formed thereby are connected in parallel with each other and with a capacitor C5. As will become more apparent hereinafter, the sensor units 43 through 46 and the capacitors C1 through C4 comprise a capacitive incrementing circuit 47 with respect to capacitor C5.

The transponder 3 includes a diode bridge 50 and an oscillating circuit 51. The diode bridge 50 consists of diodes D1, D2, D3 and D4 which are connected between the oscillating circuit 51 and the encoder 2, on the one hand, and the coupling circuit 7 on the other. When the coupling circuit 7 is active, a DC voltage will be supplied to the output terminals 53 and 54 for providing a constant voltage at a conductor 55 and to the oscillator 51.

Oscillator 51 includes an amplifier comprising a transistor Q and a first pair of resistors R2 and R3 which are connected in series across Zener diode D5 and their junction connected to the base of transistor Q. A third resistor R4 is connected between the emitter of transistor Q and terminal 54. Oscillator 51 also includes a Colpitts feedback circuit consisting of an inductance L connected between the collector of transistor Q and the other terminal of resistor R2, and a first capacitor C6 connected between the other terminal of inductor L and by a resistor R5 to the emitter of transistor Q. Capacitor C5 constitutes a second capacitance in the Colpitts feedback circuit and is connected by conductors 56, 57 and 58 and resistor R5 between the emitter and collector of transistor Q.

The transponder 3 also includes a resistor R6 and a capacitor C7 which are connected in series between the terminal 53 and resistor R5. Capacitor C7 functions to decouple the emitter of transistor Q from terminal 53, and resistor C6 desensitizes the oscillator output frequency to changes in the impedance of the lines 5 and 6.

The coupling circuit 7 includes a photocell PC1 and a neon lamp N which are connected in series with each other and by conductors 59 and 60 between one of the telephone lines 5 and one input terminal 61 of diode bridge 50. The coupling circuit 7 also includes a resistor R8 and a capacitor C8 which are connected in series with each other between conductors 59 and 60. Another resistor R9 connects the junction between photocell PC1 and neon lamp N. The other input terminal 62 of diode bridge 50 is connected by a conductor 63 to the other one of the telephone lines 6.

The coupling circuit 7 is more completely described in the copending application Ser. No. 691,021, filed Dec. 15, 1967 by Victor E. Stewart, Jr. and assigned to the present assignee.

The normal telephone central office battery voltage applied to the lines 5 and 6, which is in the order of 48 volts DC, is insufficient to fire the neon lamp N, so that the coupling circuit 7 is normally inactive and conductors 59 and 60 are effectively open circuited.

High dialing and ringing peak voltages, which may be in the order of 400 volts, are of insufficient duration to cause operation of the coupling circuit 7. However, when the remote transponder exciter 9, which is explained more fully hereinafter, is actuated, a voltage of approximately 250 volts is applied between the lines 5 and 6. As a result, sufficient charge will accumulate on capacitor C8 to break down the neon lamp N causing the latter to illuminate the photocell PC1. This, in turn, causes the photocell PC1 to go from a high impedance state to a low impedance state, thereby connecting the conductors 59 and 60. As long as the input voltage signal is greater than the lamp holding voltage, lamp N will remain illuminated so that coupling circuit 7 will, in effect, remain latched in its conductive or active state.

Lamps 19 and 20 have a common terminal connection through a conductor 66 to conductor 63. In addition, the other terminal of lamp 19 is connected to bridge output terminal 54 through a resistor R10. The other terminal of lamp 20 is connected to bridge output terminal 53 by an RC time delay circuit 67. The latter circuit includes resistors R11 and R12 and a capacitor C9 which are connected in series between diode bridge terminal 53 and conductor 66. In addition, resistor R14 and photoresistor PC2 are connected to the other terminal of lamp 20 and to the junction between resistors R11 and R12 and between resistor R12 and capacitor C9, respectively.

When the photocells 43, 44, 45 and 46 are not illuminated, they are in a high impedance state so that the capacitors C1, C2, C3 and C4 are effectively disconnected and the oscillator 51 sees merely the capacitance of capacitor C5. When either of the lamps 19 and 20 is energized, only those photocells which are opposite the holes 22 will be illuminated and thereby go from a high impedance state to a low impedance state. Thus, those capacitors connected in series with an illuminated photocell will be effectively connected in parallel with capacitor C5 so that the oscillator 51 sees a higher value of total capacitance. Preferably, capacitors C1, C2, C3 and C4 have different predetermined respective capacitances which are related so as to provide a different parallel capacitance with respect to the capacitor C5 for each position of the discs 14 and 15. For example, capacitors C1, C2, C3 and C4 may be 1nf, 2nf, 4nf and 8nf, respectively, as shown in FIG. 5 so as to provide the indicated parallel capacitance for each disc position.

As those skilled in the art will appreciate, the frequency of the oscillator 51 will be given by the expression:

$$f \cong 1/2\pi \sqrt{LC}$$

where $$C \cong (1/C6 + 1/C5 + C_n) - 1$$

and $C_n$ is the sum of those ones of the capacitances C1, C2, C3 and/or C4 that are connected in parallel with capacitance C5 as the result of their respective photocells 43, 44, 45 and/or 46 being illuminated through the holes 22 in the discs 14 or 15. As a result, the oscillator 51 will have a different output frequency for each position of the discs 14 and 15.

Figure 6:
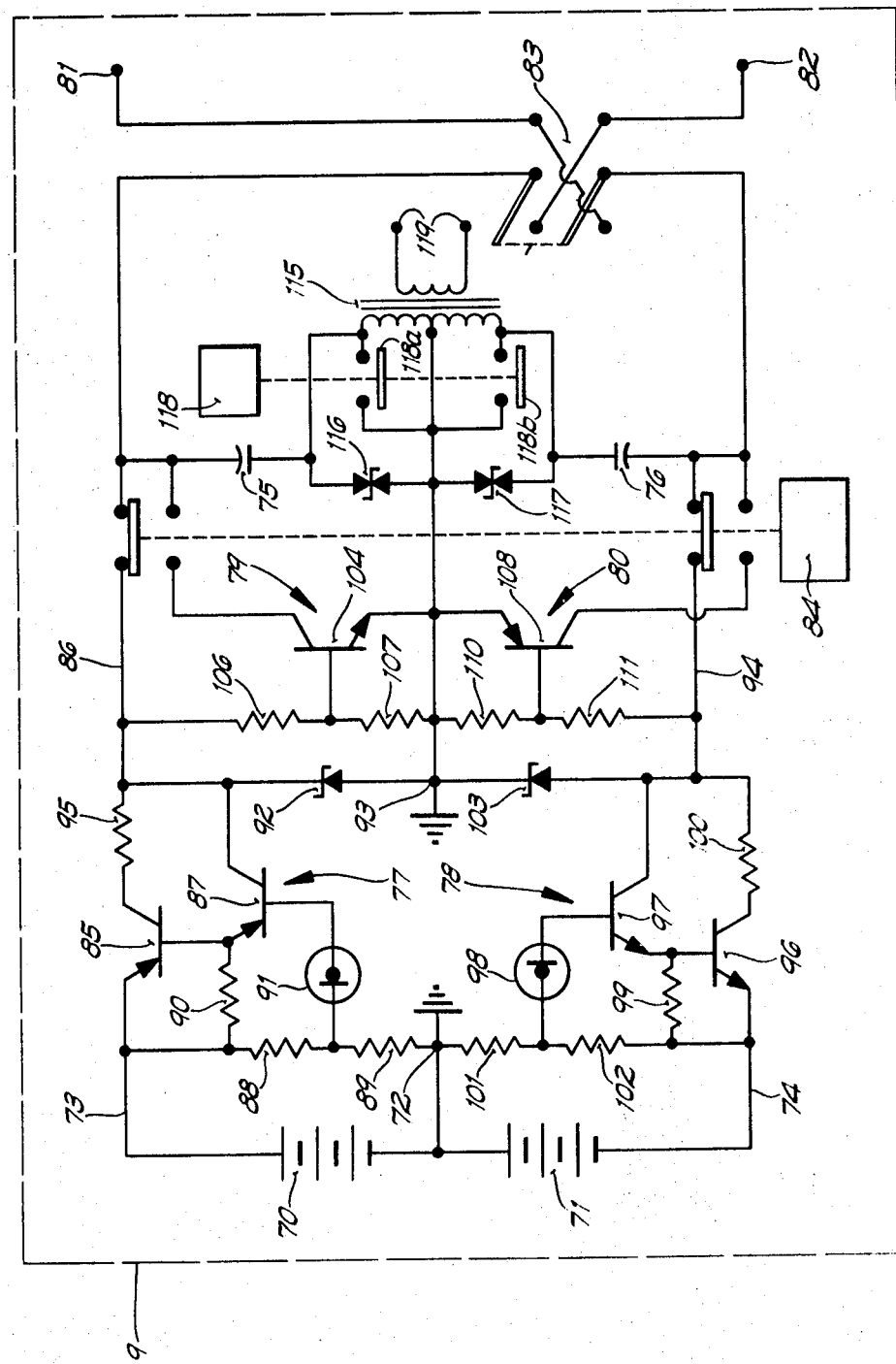
FIG. 6 is a schematic for the remote transmitter exciter shown in FIG. 1.
Figure 7:
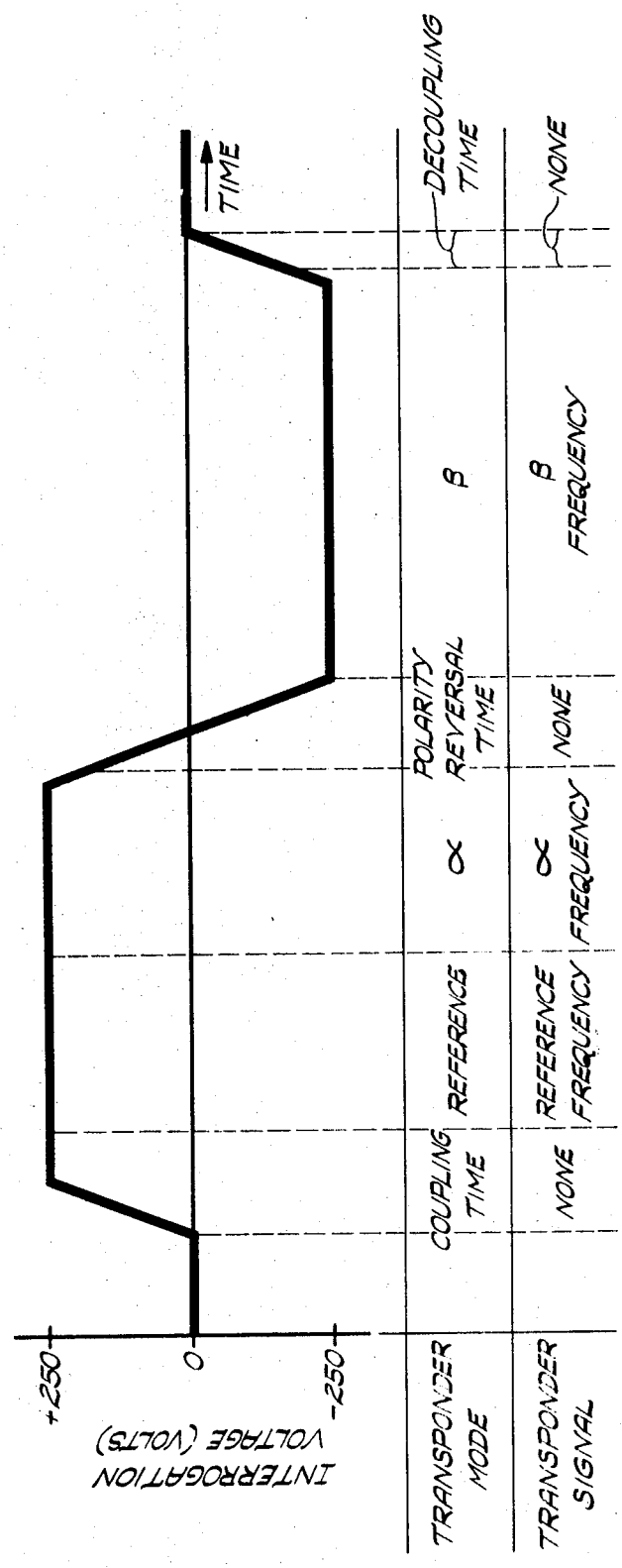
FIG. 7 is a graphical illustration of the signal format produced by the circuit of FIG. 6 and the resulting operation of the system.

FIG. 6 illustrates the details of the circuit of remote transponder exciter 9 which is effective to produce in telephone lines 5 and 6 the interrogation voltage format illustrated in FIG. 7. Transponder exciter 9 includes a pair of similar voltage sources 70 and 71. The connection point between voltage sources 70 and 71 is grounded at ground point 72. Voltage source 70 produces a voltage in conductor 73 which is positive with respect to ground, and voltage source 71 produces a voltage of similar magnitude in conductor 74 which is negative with respect to ground. A controlled rate of increase in the output signal voltage is obtained by charging capacitors 75 and 76 at a controlled current flow rate. To accomplish this controlled rate, constant current regulating circuits 77 and 78 are inserted in series with conductors 73 and 74, respectively. A controlled rate of decrease of the output signal voltage is accomplished by providing constant current regulating circuits 79 and 80 in series to be connected across capacitors 76 and 75 to discharge capacitors 75 and 76 at a controlled rate. The polarity of the output of transponder exciter circuit 9 at output terminals 81 and 82 may be reversed by operation of a conventional polarity reversing switch 83. A two-pole double-throw switch 84, when in the position shown, causes charging of capacitors 75 and 76 and, when operated to its opposite position, causes discharge of capacitors 75 and 76 through current regulating circuits 79 and 80.

Constant current regulating circuit 77 includes a PNP transistor 85 having its emitter connected to conductor 73 and its collector connected to a conductor 86 through a resistor 95. A second PNP transistor 87 has its emitter connected to the base of transistor 85 and its collector connected to conductor 86. A voltage divider comprising a resistor 88 and a resistor 89 in series is connected between conductor 73 and ground point 72. A resistor 90 is connected between conductor 73 and the base of transistor 85. A current limiter 91 is connected between the juncture of resistors 88 and 89 and the base of transistor 87. A Zener diode 92 is connected between conductor 86 and a ground point 93. As will be understood by those skilled in the art, current limiter 91 provides a substantially constant current to the base of transistor 87, which, in turn, provides a substantially constant current in the base of PNP transistor 85 which, in turn, regulates the current flow between conductors 73 and 86. Regulating circuit 77 preferably utilizes the multistage configuration shown to provide sufficient current gain.

Similarly, current regulating circuit 87 is interposed between conductor 74 and a conductor 94. Regulating circuit 78 is similar to current regulating circuit 77 but utilizes NPN transistors rather than PNP transistors. The operation of the circuit is otherwise similar, as will be understood by those skilled in the art. Circuit 78 comprises a first transistor 96, a second transistor 97 and a current limiter 98, together with resistors 99, 100, 101 and 102. A Zener diode 103 is connected between conductor 94 and ground point 93.

The constant discharge current regulating circuit 79 is conventional and consists of an NPN transistor 104 and two voltage dividing resistors 106 and 107. Similarly, the other constant discharge current regulating circuit 80 consists of a PNP transistor 108 and resistors 110 and 111.

A return tone signal pickup transformer 115 is provided to pick up the coded tone signals which return from transponder 3 through telephone lines 5 and 6. The primary winding of transformer 115 is connected between capacitors 75 and 76 with its center tap connected to ground point 93. A pair of bilateral voltage limiting devices 116 and 117 are connected respectively across the two halves of the primary of transformer 115. A relay 118 or other switching device having contacts 118a and 118b connected across the two halves of the primary of transformer 115 is operated to shunt the primary of transformer 115 during charging or discharging of capacitors 75 or 76 to eliminate DC current flow therethrough during such periods and to eliminate spiking due to an inductor in series with capacitors 75 and 76. Contacts 118a and 118b are opened during those periods when tone signals are being transmitted. The secondary winding of transformer 115 is connected to output terminals 119 which lead to a suitable decoding and utilization device (not shown).

If it is assumed that output terminal 81 is connected to telephone line 5 through line selector 11, operation of switch 83 to its right-hand position will result in a positive interrogation voltage on telephone line 5. Referring to the voltage diagram of FIG. 7, the polarity of the interrogation voltage will be taken as positive when conductor 5 is positive with respect to conductor 6, and the magnitude of the interrogation voltage will be taken as the magnitude of the voltage existing between lines 5 and 6. With switch 84 in the position shown and with switch 83 in its open position as illustrated, the interrogation voltage as shown in FIG. 7 will initially be zero. When switch 83 is operated to its right-hand position the interrogation voltage will begin to increase at a linear rate determined by the capacitance of capacitors 75 and 76 and the rate of current flow as regulated by circuits 77 and 78. As is well known to those skilled in the art, telephone bell ringing is effected by a series of rapid voltage changes in the telephone lines. This rate of increase of the present voltage signal is selected to be low enough so as not to cause ringing of the customer's telephone. The interrogation voltage increases to the maximum as determined by voltage sources 70 and 71 which maximum is illustrated as 250 volts. This maximum voltage will be held as long as switch 83 is in its right-hand position and switch 84 is in the position illustrated. When it is desired to reverse the polarity of the interrogation voltage, switch 84 is operated to its opposite position. This causes capacitors 75 and 76 to discharge through current regulating circuits 79 and 80. The interrogation voltage signal will then decrease at a rate which is again selected to be less than that required to cause ringing of the customer's telephone. When the interrogation voltage reaches zero, switches 84 and 83 are simultaneously operated so that switch 84 is returned to the position illustrated and switch 83 is operated to its left-hand position. The operation of switch 84 causes capacitors 75 and 76 to again be charged while the operation of switch 83 causes the polarity of the output appearing at terminals 81 and 82 to be reversed. The interrogation voltage, therefore, continues below zero in a negative direction at a rate which is again less than that required to cause ringing of the customer's telephone. Negative 250 volts is eventually reached and held for a desired time. The interrogation voltage is returned to zero, again at a rate less than that required to cause ringing of the customer's telephone, by operation of switch 84 to the position opposite through that shown. Capacitors 75 and 76 thereupon discharge at a controlled rate to circuits 79 and 80. The transponder exciter 9 may then be disconnected from the line by opening switch 83.

The operation of the overall system will now be described.

Assume that a reading of the meter 4 is to be taken. The line selector 11 is actuated to select the desired customer lines 5 and 6 and to make electrical connection thereto. The remote transmitter exciter 9 is actuated and places a positive interrogation voltage on line 5 with respect to line 6. This initiates the coupling time indicated in FIG. 7 as the transponder mode. Eventually capacitor C8 will charge to a sufficiently high voltage to break down the neon lamp N in the coupling circuit 7. This illuminates the photocell PC1 which then changes from a high impedance state to a low impedance state, whereby current may continue to flow to lamp N. With the photocell PC1 in its low impedance state, the lamp N will remain illuminated as long as the interrogation voltage signal is applied to customer lines 5 and 6.

The diode bridge 50 performs the function of signal receiving and mode selection. More specifically, the bridge 50 receives the actuating signals from the remote transmitter exciter 9 and selects which of the lamps 19 and 20 will be energized so that the discs 14 and 15 may be selectively read.

When the coupling circuit 7 becomes active at the end of the coupling time, voltage appears across the diode bridge output terminals 53 and 54 which energizes the oscillator 51. In addition, this voltage, less the small drop across diode D4, appears across the lamp time delay circuit 67, which momentarily prevents lamp 20 from illuminating. The voltage across lamp 19 will be that across diode D1, and this will be insufficient to cause the lamp to light. Initially, therefore, only capacitors C5 and C6 will be in the oscillator circuit 51 and, accordingly, a reference frequency signal will be placed on the lines 5 and 6 and received at terminals 119. With reference to FIG. 7, this period of operation is indicated as the reference transponder mode. After a time delay determined by the values of resistance and capacitance in the time delay circuit 67 and the lamp breakdown voltage, the neon lamp 20 will be illuminated, and predetermined ones of photocells 43, 44, 45 and 46 will be activated in accordance with the position of disc 15. This will modify the capacitance seen by the oscillator 51, and, accordingly, a second frequency signal will be applied to lines 5 and 6 to indicate the position of the disc 15. This period of operation is indicated in FIG. 7 as the alpha transponder mode, and the output signal frequency is called the alpha frequency.

It will be appreciated that the second frequency signal will be some increment below that of the first or reference signal. By thus reading the disc position as a predetermined variation or percentage of the reference frequency, rather than at a discrete frequency, variations in capacitive values as a result of aging, for example, will not prevent unambiguous readings.

After disc 15 has been read and the alpha frequency transmitted during the alpha transponder mode has been received, the remote transponder exciter 9 will reverse the polarity of the customer's lines 5 and 6 during the time indicated as the polarity reversal time transponder mode on FIG. 7. Lamp 19 will thereby be energized through conductors 63, 66, resistor R10 and diode D3. The oscillator 51 is energized through diodes D1 and D4 while diode D1 prevents energization of lamp 20. This initiates the beta transponder mode, and the beta frequency is transmitted to indicate the position of disc 14. Here again, certain of the photocells 43, 44, 45 and 46 may be illuminated in accordance with the position of the disc 14 so that certain ones of the capacitors C1, C2, C3 and C4 may be connected in parallel with the capacitor C5. This will again provide a tone signal at the beta frequency in accordance with the reading of the disc 14 to the customer lines 5 and 6 and which is received at terminals 119.

Because the disc 15 makes 16 steps for each step of disc 14, a total of 256 steps of the meter 4 is possible for each encoder register cycle. If meter readings of a greater number of steps per cycle are desired, the discs 14 and 15 may be made with a greater number of code units 22 and 23, or an additional set of discs, lamps and sensor units may be provided.

It will also be appreciated that additional discs could also be read through conductors 56 and 57 by providing further selectively operable lamps and/or additional photocells or capacitive incrementing circuits 47 having different capacitive values so that different tone signals will be produced. While in the preferred embodiment of the instant invention switching of the capacitors C1, C2, C3 and C4 is performed by photocells 43, 44, 45 and 46, it will be appreciated that this switching function could be performed by other devices as well. In addition, it is not necessary that a capacitive incrementing circuit be employed to modify the tone signal output of an oscillator, but an incrementing circuit which modifies other impedances, such as inductances, could also be employed to modify the output tone signal of an oscillator so that a tone signal could be provided to convey data in a plurality of information bits.

In addition to the features of the encoder 2 and transponder 3 which contribute to the miniaturization of this device, it will be appreciated that the provision of an interrogation signal which not only commands the operation of the transponder 3 but provides the power for the operation thereof further contributes to the miniaturization of the equipment installed at each customer's location and greatly reduces the cost of the system.

Accordingly, while only a single embodiment of the invention has been shown and described, it is not intended to be limited thereby, but only by the scope of the appended claims.

1. A data transmitting system comprising:
   an exciting means for producing a control signal having a first level produced for a selected duration and a second level produced for a selected duration following the duration of the first level;
   a transponder means connectable to receive and responsive to the control signal comprising a first information means for producing a first information output signal in response to the first level control signal, a second information means for producing a second information output signal in response to the second level control signal, and a reference means for producing a reference output signal in response to the first level control signal; and
   a timing means for controlling the reference means and the first information means to effect operation of said reference means during a first selected portion of the duration of the first level control signal to thereby produce the reference output signal during said first selected portion and to operate the first information means during a second selected portion of the duration of said first level control signal to thereby produce the first information output signal during said second selected portion.

2. A data transmitting system according to claim 1 wherein said second selected portion follows said first selected portion of the control signal.

3. A data transmitting system comprising:

a first information register means;

a second information register means;

a first coding means for producing a first coded output indicating the state of the first information register means;

a second coding means for producing a second coded output indicating the state of the second information register means;

an exciting means for producing a control signal having a first level and a second level;

a transponder means connectable to be responsive to the control signal comprising a first information means responsive to the first coded output for producing a first information output signal indicative of the state of the first information means in response to the first level control signal, and a second information means responsive to the second coded output for producing a second information output signal indicative of the state of the second information register means in response to the second level control signal, and a reference means for producing a reference output signal in response to the first level control signal; and a timing means for controlling the reference means and the first information means to operate said reference means during a selected portion of the first level control signal to thereby produce the reference output signal during said selected portion and to operate said first information means during at least part of the remaining portion of said first level control signal to thereby produce the first information output signal during said part of said remaining portion.

4. A data transmitting system according to claim 3 wherein the exciting means consecutively produces the first level control signal for a selected duration and the second level control signal for a selected duration.

5. A data transmitting system according to claim 4 wherein said second selected portion follows said first selected portion of the duration of the control signal.

6. A data transmitting system as defined in claim 3 also comprising transmitting means for transmitting the information output signals to a central location remote from said transponder means.

7. A data transmitting system as defined in claim 3 in which said first and second information register means are connected to respond to a utility meter.

8. A data transmitting system as defined in claim 6 in which said transmitting means comprises telephone lines, and said control signal comprises an electrical voltage signal and said levels are voltage levels applied to said telephone lines.

9. A data transmitting system as defined in claim 3 wherein said control signal is a voltage signal with said first level having one polarity and said second level having another polarity and said reference means is responsive to the one polarity to initiate production of the reference output signal; said timing means is responsive to said one polarity to initiate after a time delay the first information signal indicative of the state of said first register means; and said second information means is responsive to the other polarity to initiate production of the second information signal indicative of the state of said second register means.

10. A data transmitting system as defined in claim 3 in which said first and second information register means are connected to the register elements of a utility meter.

11. A data transmitting system as defined in claim 3 wherein said control signal is a voltage signal with said first level voltage signal having a positive polarity and said second level voltage signal having a negative polarity.

12. A data transmitting system comprising:

an exciting means for producing a control signal having a first level and a second level;

a transponder means connectable to receive and responsive to the control signal comprising a first information means for producing a first information output signal in response to the first level control signal, a second information means for producing a second information output signal in response to the second level control signal, a reference means for producing a reference output signal in response to the first level control signal; and a timing means for controlling the reference means and the first information means to effect operation of said reference means during a first selected portion of the duration of the first level control signal to thereby produce the reference output signal during said first selected portion and to operate the first information means during a second selected portion of the duration of said first level control signal to thereby produce the first information output signal during said second selected portion.